United States Patent [19]

Bompard et al.

[11] 4,080,915

[45] Mar. 28, 1978

[54] METHOD OF AND APPARATUS FOR THE PRODUCTION OF BODIES OR PARTS OF THREE-DIMENSIONAL FABRIC

[75] Inventors: Bruno Bompard, Villeurbanne; Jean Brochier; Alain Bruyere, both of Lyon, all of France

[73] Assignee: Commissariat a l'Energie Atomique, Paris, France

[21] Appl. No.: 698,700

[22] Filed: Jun. 22, 1976

[30] Foreign Application Priority Data

Jun. 26, 1975 France ................................. 75 20117

[51] Int. Cl.² ........................ B65H 81/00; D05B 93/00
[52] U.S. Cl. ........................................ 112/412; 112/262; 242/7.21
[58] Field of Search .................. 112/412, 262, 121.15, 112/2, 63; 428/223, 225, 113; 242/7.21, 7.01, 7.02; 139/387 R, 408

[56] References Cited

U.S. PATENT DOCUMENTS

| 975,940 | 11/1910 | Fetterly | 139/408 |
| 2,283,802 | 5/1942 | Gingher | 112/412 X |
| 2,987,100 | 6/1961 | Strickland | 242/7.21 X |
| 3,250,493 | 5/1966 | Burkley et al. | 242/7.21 X |
| 3,365,918 | 1/1968 | Hughes | 112/412 X |
| 3,719,212 | 3/1973 | Emerson et al. | 139/387 R |
| 3,749,138 | 7/1973 | Rheaume et al. | 139/408 |

FOREIGN PATENT DOCUMENTS

| 1,960,595 | 6/1971 | Germany | 242/7.21 |
| 2,058,857 | 6/1971 | Germany | 139/408 |

*Primary Examiner*—Werner H. Schroeder
*Assistant Examiner*—Peter Nerbun
*Attorney, Agent, or Firm*—Cameron, Kerkam, Sutton, Stowell & Stowell

[57] ABSTRACT

This invention relates to a body of three-dimensional fabric, a method of producing such bodies or parts of various shapes from three-dimensional fabric and also relates to apparatus for industrial performance of this method.

16 Claims, 14 Drawing Figures

METHOD OF AND APPARATUS FOR THE PRODUCTION OF BODIES OR PARTS OF THREE-DIMENSIONAL FABRIC

BACKGROUND OF THE INVENTION

Three-dimensional fabrics are already known in the art and, more particularly, are in the form of thick elements in which the fabric constituents which may be yarns, fibres, rovings, strands etc, are distributed through the fabric in three different directions which are generally perpendicular to one another but which may also have a given relative angular orientation to one another other than 90°. More particularly, three-dimensional fabrics of this kind are used in certain areas of industries because of their high resistance to mechanical stresses, their thermal insulation properties and their good resistance to shocks and ablation. More particularly, recent developments in the technology of high-performance fibres or yarns, more particularly carbon fibres, silica fibres or fibres of certain plastic materials, have increased the advantage of three-dimensional fabrics, e.g. for the production of coverings for the bodies or heads of rockets or other devices or heat shields, for their protection on high-speed re-entry into atmosphere as a result of the very high heating and friction they undergo. Other applications are also under study, more particularly for the production of brake discs or plates requiring very high resistance to wear together with high heat dissipation.

Certain methods of producing such thick fabrics are already known, wherein a suitably adapted loom or weaving machine is used so that a two-directional fabric produced by a conventional weaving method and comprising, more particularly, a warp yarn and a weft yarn has a third yarn interwoven in a direction differing from the direction of the first two. Although this method may be useful when the fibres used are cotton or synthetic yarns having high tensile and flexural strength, conditions are quite different when the three-dimensional fabric has to be made by means of carbon or graphite fibres, for example, which even in the form of relatively thick rovings cannot withstand the friction of a shuttle or reed which is indispensable in weaving fabric, without breaking practically immediately.

To obviate this difficulty, it has already been proposed to make three-dimensional fabrics from graphite or carbon fibres or yarns from a graphite body or mandrel on which rigid radial rods or spikes forming one of the fabric directions are pre-machined. The other two yarn directions are made by axial weft-winding and circumferential winding between these radial spikes. Once the required fabric thickness has been obtained, the whole is rendered rigid by the incorporation of a thermosetting resin, the initial mandrel then being removed by machining or some other process, spikes to which the warp and weft yarns are connected simply being left in the thickness of the fabric. However, it will be seen that such a method is extremely expensive to use and, in particular, does not allow a high yarn density to be obtained in the radial or third direction, and this is a serious disadvantage for some applications, since the resulting fabric does not have satisfactory homogeneity and hence suitable performance in the three directions. Also, this method lends itself only with difficulty to the production of hollow bodies without any gaps, in the form of endless sleeves whose external contour or profile is a curve which may in some cases be relatively complicated.

SUMMARY OF THE INVENTION

This invention relates to a method which obviates these disadvantages while enabling bodies or parts of any geometric shape, flat or bodies of revolution, with or without a rectilinear generatrix, to be produced from a very thick three-dimensional fabric in which the density of the yarns, filaments, fibres, rovings, etc. in three preferential directions of the fabric can be adjusted at will and more particularly be made substantially equal.

To this end, the method is characterized in that it comprises forming at least one first layer of parallel yarns extending in a first direction, superimposing at least one second layer of parallel yarns plane by plane on the first layer, said second layer of parallel yarns extending in a second direction differing from the first direction, repeating the alternate superimposition of first and second layers of yarns to give a thick stack, sewing the stack of first and second layers by means of at least one third yarn extending in a direction forming a pre-determined angle to the plane formed by the direction of the yarns in the first and second layers, said third yarn forming a continuous line of stitches, and repeating the sewing of the stack by the third yarn to form a succession of parallel stitching lines which are adjacent to, but offset from, one another, to cover the surface of the stack.

Of course, the term "yarn" used in this way to define the constituents of the fabric is to be taken in its widest sense and, more particularly, cover any association of unitary fibres or filaments in any form whatsoever.

Preferably, the method according to the invention comprises arranging the yarns in the first and second layers, on the other hand, and the sewing yarn, on the other hand, in three respectively perpendicular directions. The stitching line formed by the third yarn extends in a plane at right angles to the yarns of the first and second layers, the sewing yarn having a direction forming an acute angle with the directions of the yarns in these first and second layers. Advantageously, the yarns forming the first and second layers and the sewing yarns originate from the same supply bobbin. More particularly, when the body to be produced is a body of revolution about an axis, the yarns of the first layers extend in the transverse or circumferential direction on the body, the yarns of the second layers extend in the axial direction and the sewing yarn extends in a radial direction, the stitching lines being oriented in parallel relationship to the direction of the yarns in one of the layers and being offset from one another in the direction of the yarns in the other layer.

Advantageously, the sewing yarn extending through the superimposed layers is a continuous tensioned yarn disposed along a sinusoidal curve, the crests of which are situated on the end faces of the stack of layers, the strands of adjacent yarns being parallel to one another in the thickness of the stack. Preferably, and according to a specific feature of the method, the stack of layers is stitched by the third yarn by means of a chain stitch.

As required, the fabric yarns are selected from yarns of glass, silica, carbon, graphite, polyamides, polyimides, etc. Also, the yarns of the layers are of the same or different types. These yarns may more particularly be formed from fibres, filaments, rovings, etc., continuous or discontinuous, contiguous or non-contiguous, braided, in the form of strands or grouped in parallel without being interwoven.

In an application which is adapted more specifically to the production of bodies or revolution, the method comprises forming a first layer of fabric by means of a continuous yarn disposed along a helix wound circumferentially on a supporting mandrel, superimposing the yarns of a second layer on the helix of the first layer in a substantially axial direction in order completely to cover the first layer, covering the second layer by a third layer identical to the first, and then third by a fourth identical to the second, and so on, then sewing the stack of layers by a third yarn through the appropriately apertured supporting mandrel along stitching lines also extending in the axial direction, and finally withdrawing the supporting mandrel.

The resulting body of three-dimensional fabric may then be impregnated by a conventional method using a matrix-forming resin to fill the free spaces between the yarns. In the case, more particularly, in which the fabric uses carbon or graphite yarns, the resin is preferably a phenolic resin, and the body made by the method according to the invention may advantageously undergo a final graphitization treatment.

The invention also relates to a production apparatus adapted to performance of the above method.

More particularly, the apparatus is characterised in that it comprises a hollow mandrel supporting the body under manufacture, having the inner shape of said body and having an elongate clearance, the position of which varies over the mandrel periphery, a first system for distributing the yarn of the first layers in a direction linked to the mandrel, a second system for distributing the yarn of the second layers in a second direction also linked to the mandrel, an orientable sewing head provided with a needle cooperating with a hook, the needle and the hook being disposed facing one another respectively on either side of the clearance inside and outside the mandrel, means for producing relative displacement between the mandrel and each system for the distribution of the yarns of the first and second layers, and means for displacing the mandrel in relation to the sewing head in the direction of the clearance formed in the mandrel.

In a preferred embodiment of the invention, the hollow mandrel has a profile of revolution about an axis and is formed by an assembly of independent adjacent segments supported by two circular end rings, the mandrel clearance being produced by removal of any one of the segments between the two rings.

According to a specific feature, the means for producing a relative displacement between the mandrel and the first yarn distribution system comprise a shaft engaged along the mandrel axis and connected to end rings by fixing cheeks, said shaft being provided with at least one drive gearwheel cooperating with a motor rotating the mandrel about its axis, and a worm driven in synchronism with the mandrel shaft, said worm cooperating with a winder carriage bearing a yarn guide moving in a plane containing a generatrix of the mandrel, the rotation of the mandrel in combination with the displacement of the carriage applying the yarn around the mandrel in the form of a continuous helix.

According to another specific feature, the rings and, if required, the mandrel segments, are formed with apertures for mounting spikes extending radially outwards from the mandrel, said spikes being adapted to tension the yarn of the layers in the direction of the mandrel generatrices, said yarn being provided by the second distribution system comprising a weft-winding carriage moving with a reciprocating movement between the spikes.

Other features of the production method according to the present invention and the apparatus for performing this method will be apparent from the following description of a number of exemplified embodiments and examples of application given by way of example without limiting force with reference to the accompanying drawings wherein:

DETAILED DESCRIPTION OF THE DISCLOSED EMBODIMENT

Figure 1:
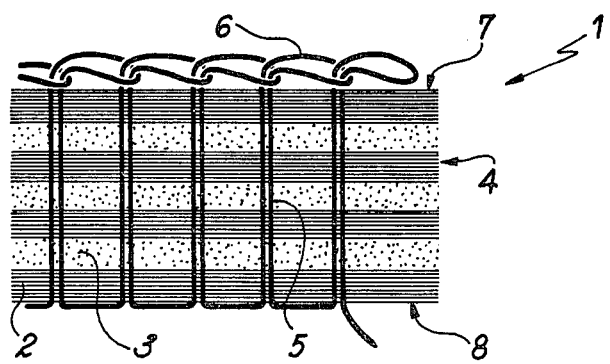
FIG. 1 is a cross-section of a portion of a three-dimensional fabric produced by the method according to the invention, showing more particularly the relative arrangement of the superposed layers and of the sewing yarn for the latter.
Figure 12:
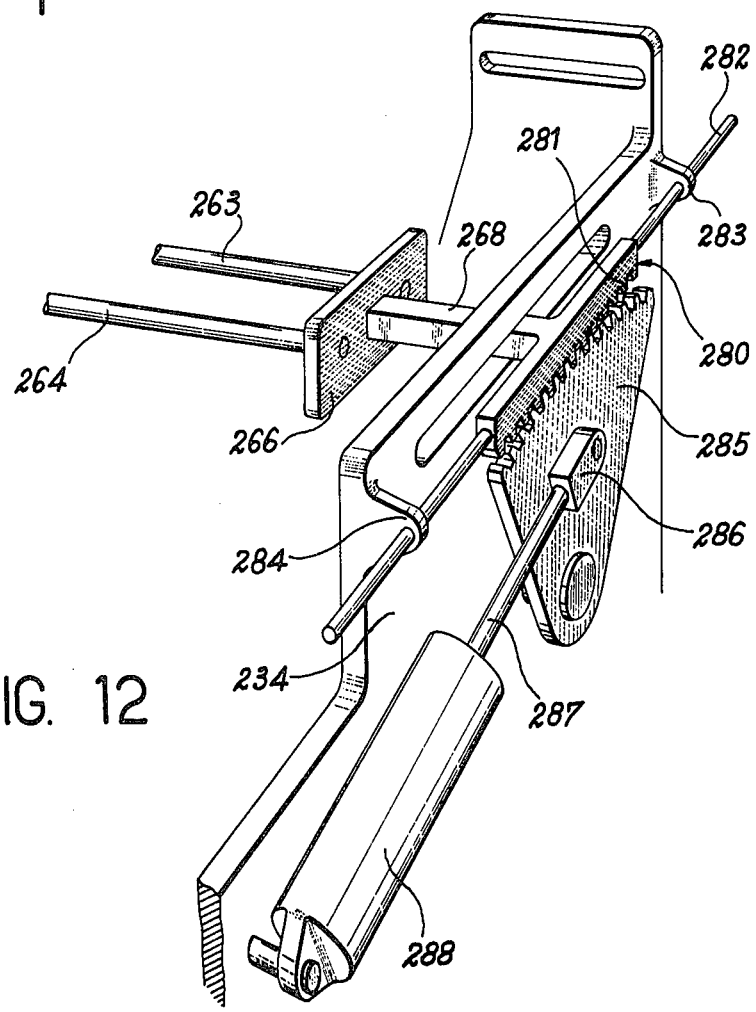
FIG. 12 is a detail of a system advantageously used in the station of the machine shown in FIG. 10.

FIG. 1 is a diagram showing part of a body of three-dimensional fabric made in accordance with the features of this invention. This fabric is denoted by the general reference 1 and comprises a first layer 2 of yarns, filaments or other similar constituents which are braided or in the form of rovings formed by parallel yarns, this first layer extending in a direction parallel to the drawing plane. A second layer 3 is applied to the first layer and is also formed by yarns, or filaments of the same kind, of the same nature as, or a different nature from the yarns of the first layer, said second layer 3 extending in a direction perpendicular to the first layer. The yarns of the first and second layers may, as required, originate from different bobbins or from one and the same bobbin.

According to the invention, the layers 2 and 3 are placed one upon the other flat as many times as required to give a stack 4 of a thickness corresponding to that of the article being manufactured. The layers 2 and 3 of the stack 4 are then sewn together by a yarn 5 extending completely through the stack in a direction in which said yarn is substantially perpendicular to the yarn of the layers 2 and 3. The yarn 5, which forms a series of adjacent stitch lines, has a substantially sinusoidal profile in the thickness of the fabric, while the connections between parallel portions extending through the stack have connecting loops 6 which preferably, but not exclusively, form a conventional chain stitch, the yarn tension on sewing applying these loops against the facing parallel surfaces 7 and 8 of the stack.

According to the invention, the body 1 may be made with any profile, more particularly it may be closed on itself and its contour may be specially adapted to the required purpose. More particularly, and in a first embodiment, the profile may be that of a right cylinder, in which case the method is performed using the apparatus described hereinafter with reference to FIGS. 2 - 8, comprising two successive parts one of which allows the stack of superposed layers to be formed to the required thickness while the other sews the layers in a third direction perpendicular to that of the yarns in these layers.

Figure 2:
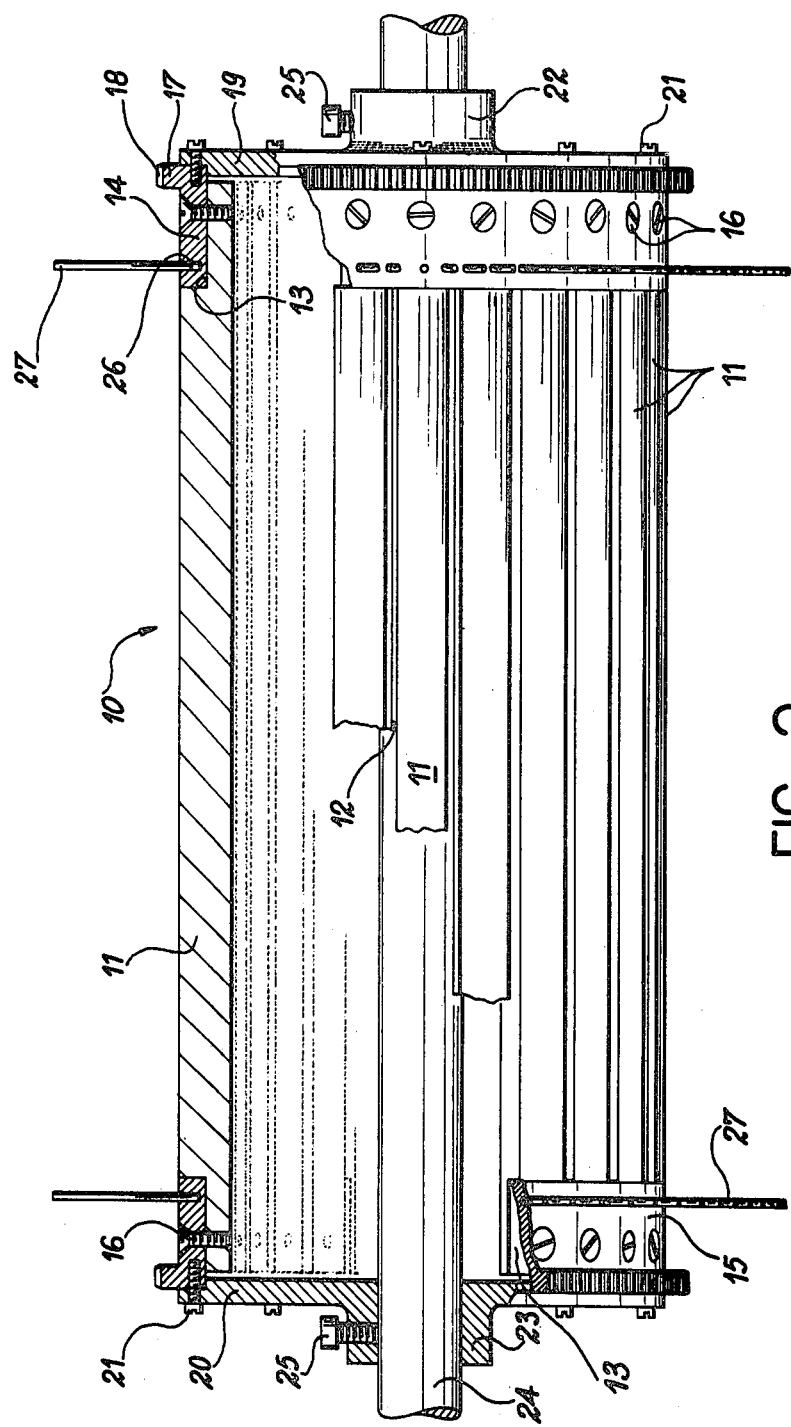
FIG. 2 is an elevation and partial section of a supporting mandrel for the production of a three-dimensional fabric body of cylindrical shape.

To this end, and as will be apparent from FIG. 2, the apparatus uses a cylindrical hollow rigid mandrel 10, the outer shape of which is the shape of the body to be produced. This cylinder is advantageously in the form of an assembly of a series of longitudinal detachable segments 11 distributed over the periphery and with a narrow gap 12 between two successive segments. Each segment 11 has a joggle 13 at its two ends allowing the mounting of two end rings 14, 15 respectively, the segments being individually assembled with respect to the rings by means of screws 16 extending through said rings and engaging in tapped apertures formed in the ends of the segments. The ring surfaces remote from the segments have a collar 17, the outer surface of which has teeth 18 to rotate the cylinder 10 about its axis in the manner to be described hereinafter. At the ends of the mandrel 10, the rings 14 and 15 are also connected to two flat circular cheeks 19, 20 respectively, which are urged against the edges of the rings by locking screws 21. The central parts of the cheeks are provided with two sleeves 22, 23 respectively extending in line with the mandrel axis for engaging and guiding a drive shaft 24 extending through the mandrel, the cheeks 19 and 20 being locked on said shaft by screws 25. Blind holes 26 are formed in the outer surface of the rings 13 and 14 near the ends of the segments 11 and contain spikes 27 which extend radially from each ring and are suitably and uniformly distributed along the periphery of the mandrel 10 in register with the segments 11 preferably with a slight angular offset from one ring to the next.

Figure 3:
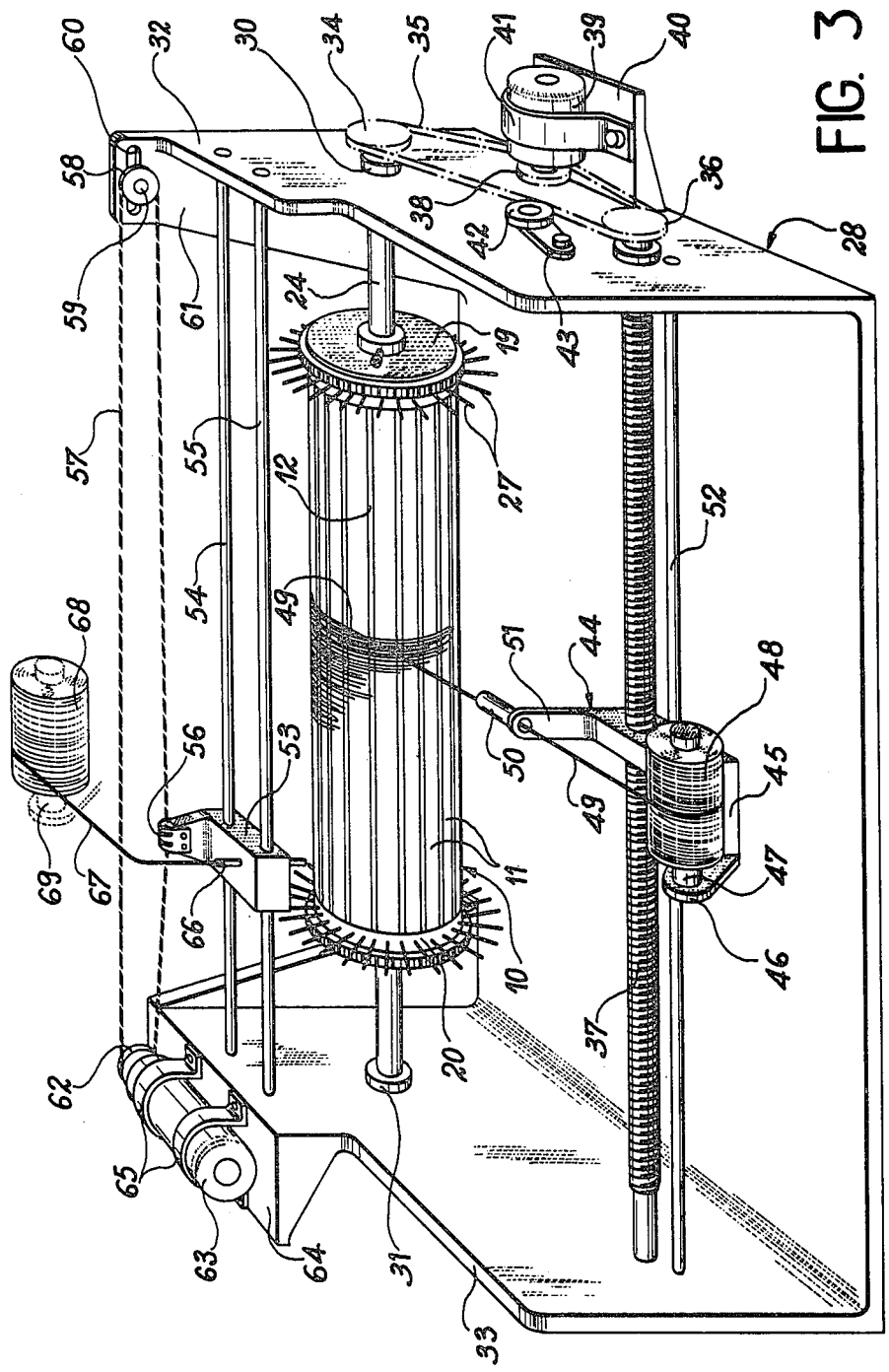
FIG. 3 is a perspective showing the first station of the apparatus for producing the superimposed fabric layers on the mandrel shown in FIG. 2.

The cylindrical mandrel 10 thus devised is adapted to be fitted in a first working station where the mandrel is covered with the succession of layers of yarn or filaments required to form the fixed stack of three dimensional fabric, this first station being shown in FIG. 3.

Referring to this Figure, this station comprises a support frame 28 for the end of the mandrel drive shaft 24 which extends through two bearings 30, 31 respectively provided in two parallel side plates 32, 33 of the frame. Adjacent the bearing 30 shaft 24 continues beyond plate 32 and is connected to a drive gear 34 cooperating with a chain 35. The latter extends over a reversing gearwheel 36 to drive in synchronism with shaft 24 a worm 37 mounted between the plates 32 and 33 of the frame 28, the function of the worm being defined hereinafter. Chain 35 also passes over a drive gear 38 keyed on the output shaft of a drive motor 39 rotatable at a given speed or with a step-by-step movement of given amplitude, said motor resting on a bracket 40 belonging to plate 32 and being secured by saddles 41. The tension of chain 35 driving shaft 24 and worm 37 is produced by a tensioning pulley 42 mounted at the end of a pivoting arm 43.

The worm 37 driven with shaft 24 cooperates with a winder carriage 44 comprising a screwthreaded part acting as a nut, said carriage being continued in the form of a supporting plate 45 provided with a lateral flat 46 on which a spindle 47 is mounted for an adjustable friction bobbin 48. With this bobbin it is possible continuously to feed out with a suitable tension a yarn, filament or other element 49 of the same kind in the form of a braiding or a roving, whereby a first layer can be formed on the cylindrical mandrel 10 on which the yarn 49 is wound circumferentially in the form of a continuous helix. To this end, yarn 49 passes through a guide 50 mounted on a lug 51 connected to the carriage 44, the rotary movement of the worm 37 driven by the motor 39 rotated at uniform speed being converted to a traversing movement of the bobbin carriage 44 parallel to the mandrel axis by means of a sliding rod 52 parallel to screw 37 mounted between plates 32 and 33 of frame 28, the carriage sliding along said rod.

With this system, the bobbin carriage 44 deposits a first layer on the outer surface of the mandrel 10 formed by the adjacent segments 11, and in this layer the yarn 49 is distributed in a first transverse direction from one end of the cylinder to the other with a pitch which is determined by the screwthread of screw 37, traversing of the carriage and the speed of winding of the yarn being co-ordinated between them from one end of the mandrel to the other, where a safety means (not shown) stops the carriage, e.g., by disengagement from screw 37. Of course, if the pitch of the drive screw or the ratios of the gearwheels are changed the yarn can be deposited in the layer contiguously, in superposed or spaced relationship, depending upon the characteristics of the body under manufacture. Similarly, for each layer of the kind described above, the bobbin carriage can be returned to one end of the mandrel, the drive always being in the same direction, or else the direction of rotation of the screw can be reversed to provide carriage travel alternately from one end to the other and vice versa.

Once the first layer of yarn has been deposited on the mandrel 10, the apparatus provides a second layer by means of a yarn extending peripherably perpendicularly to the direction in the first layer, more particularly, in this case, along successive generatrixes of the cylinder. To this end, the apparatus uses a second carriage 53, i.e. a weft carriage, guided on two rods 54, 55 which are parallel to one another and to the axis 24 of the mandrel 10. This carriage 53 comprises a lateral extension having a clip 56 connecting the carriage to an endless drive cable 57. The same is guided at one end on a reversing pulley 58 whose spindle 59 is mounted freely in a horizontal slot 60 formed in a side plate 61 belonging to plate 32 of frame 28 to adjust its tension, and at the other end on a drive pulley 62 driven by a motor 63 resting on a bracket 64 of plate 33, being secured thereon by saddles 65. Weft carriage 53 also comprises a guide 66 for a yarn, filament or the like, 67, which is supplied to the carriage 53 from an adjustable-friction bobbin 68 mounted on a spindle 69. Like the yarn 49 of the first layer, the yarn 67 of the second layer may be in any suitable form, more particularly in the form of braiding, strands, roving etc., depending upon the nature of the fibres or filaments forming it and the required characteristics of the body.

The yarn 67 for the second layer is deposited along the generatrixes of cylinder 10 by means of the spikes 27 fixed on the end rings 14, 15 of the mandrel 10 (FIG. 2). To this end, when the free end of yarn 67 has been joined to one of the spikes of the ring 14, for example, longitudinal traversing of the carriage 53 on the rods 54 and 55 is effected towards the other ring 15 of the opposite end so as to deposit yarn 67 on the cylinder surface already covered by the previously formed first layer of yarn 49. At the opposite end, when the yarn 67 passes the spike on ring 15 in register with the initial spike on ring 14 except for the slight angular off-set of these spikes, mandrel 10 is driven by motor 39 with a stepwise motion while the direction of rotation of motor 63 is reversed. Carriage 53 thus moves off in the opposite direction, yarn 67 returning to the corresponding spike 27 and passing to the other side thereof and giving a suitable yarn tension. The process is repeated all round the mandrel until the same has rotated completely through 360°. Of course, during this operation of depositing the second layer, the first winder carriage 44 is in the waiting position, inter alia it may be disengaged from the drive screw 37.

According to the invention, the mandrel 10 is covered in this way layer by layer with yarns 49 and 67 until the required thickness is almost that of the final body required. Once these operations are completed, the mandrel 10 covered with a stack 71 of the kind defined is ready to receive the third yarn direction which is provided by a sewing process which is itself relatively conventional.

Figure 4:
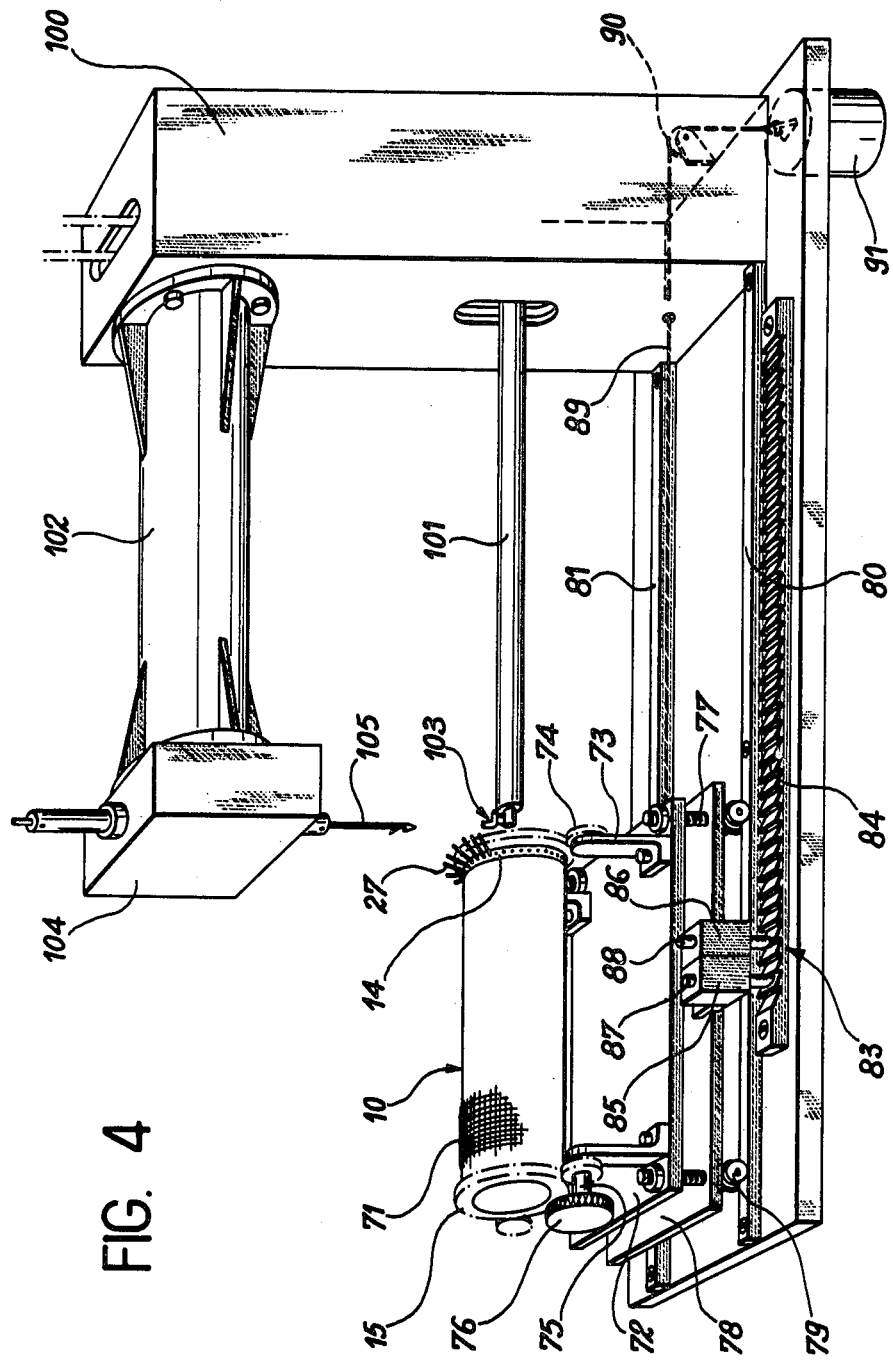
FIG. 4 is another perspective view of a second station of the apparatus in which the mandrel covered by the stack of layers receives a sewing yarn in a third direction.

To this end, mandrel 10 together with stack 71 is transferred to a second station, which is shown diagrammatically in FIG. 4. The mandrel 10 is first separated from its drive shaft 24 and then from its end cheeks 19 and 20, the remaining assembly which includes the segments 11 and rings 14 and 15, then being lifted and placed on a support plate 72. The latter has four vertical columns 73, each containing a gearwheel 74 which cooperate in pairs with the teeth 18 provided on the rings 14 and 15 so that the mandrel is driven and rotated about its axis. One of the gearwheels 74 has a spindle 75 terminating in a handhweel 76 whereby the operative can manually or by any appropriate transmission means pivot the mandrel 10 on itself through a given angle of rotation. Plate 72 rests by four screwthreaded rods allowing adjustment of the horizontality of its plane, on a carriage 78 provided with four wheels 79 running in pairs on lateral guide rails 80, 81 respectively mounted on a fixed plinth 82. A rack 83 is mounted on this plinth in parallel relationship to the rails and its teeth 84 are spaced by a pitch equal to that of two stitches of the seam which is to be sewn. Traversing of the carriage 78 is controlled for this purpose by two electromagnets 85, 86, the plungers of which actuate two pistons 87, 88 which are controlled alternately so that when one of the pistons is in contact with a tooth of the rack and the other is in contact at half the distance between the two teeth, the carriage advances each time by half the distance between these two teeth. Carriage 78 is fixed to the cable 89 passing over a reversing pulley 90 and connected to a counterweight 91 whereby a substantially constant traction can be exerted and, in conjunction with the control electromagnets, the stepwise advance of the carriage can be obtained.

FIG. 4 also illustrates the sewing machine used in the apparatus, and this machine, whose principle of operation is already known, is suitably adapted for the specific application to which it is put. More particularly, this machine comprises a support frame 100 resting on the plinth 82, said frame comprising two arms 101, 102 extending parallel to the axis of the mandrel 10. A hook 103 is disposed at the end of the arm 101 adapted to engage inside mandrel 10 through the aperture in ring 14 or 15 situated opposite it, while the end of arm 102 disposed above the cylinder 10 has an head 104 beneath which projects a needle 105 mounted in register with the hook 103 and adapted to cooperate therewith through the mandrel 10 to form a chain stitch on either side of the stack 71.

Figure 5:
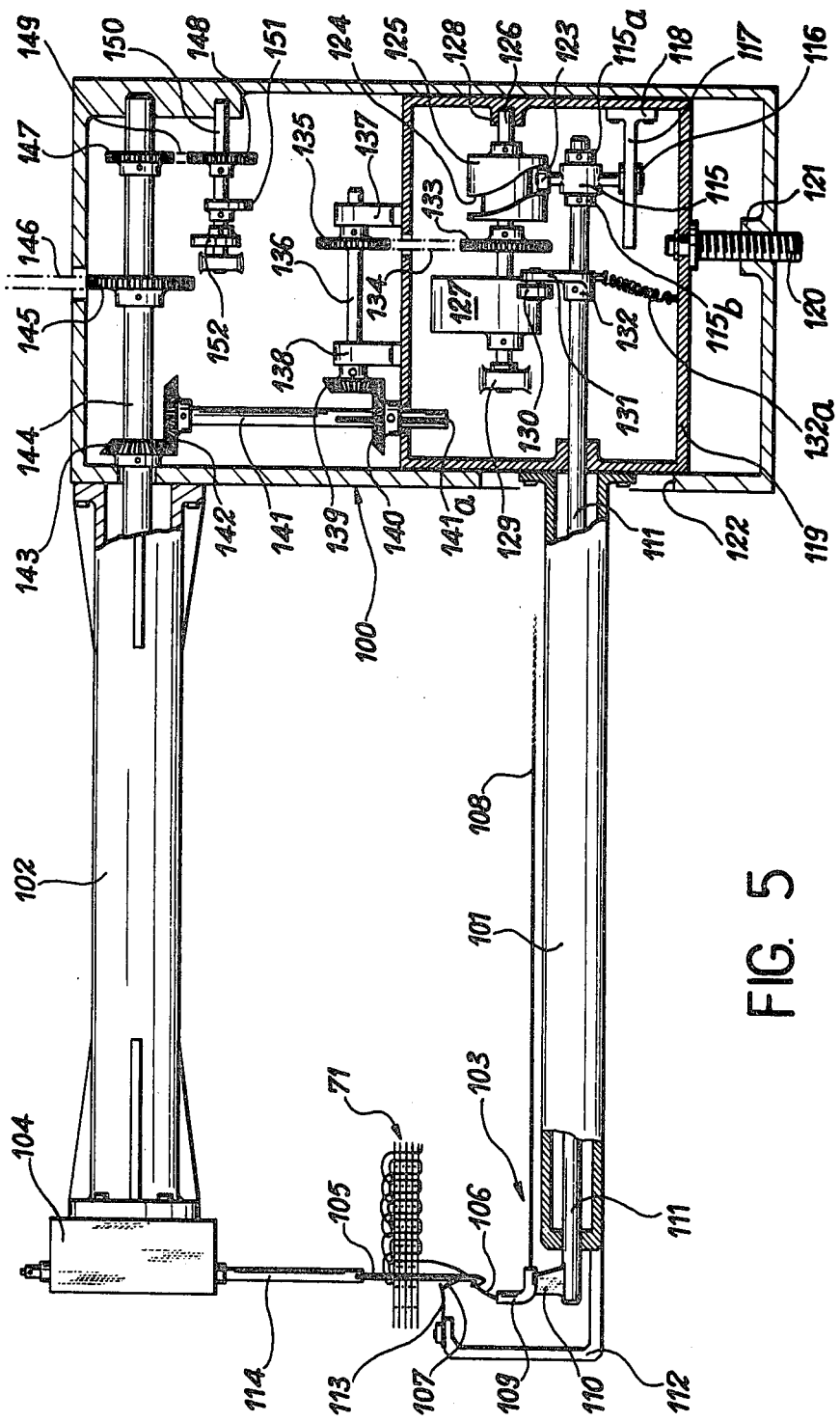
FIG. 5 is a detail in cross-section to an enlarged scale of the sewing machine for sewing the superposed layers.

FIG. 5 is a more detailed view of the sewing machine used for forming the third yarn in the stack 71. It will be seen from FIG. 5 that needle 105 borne by head 102 is of a conventional type and has at its lower end a nose 106 above which is articulated a pivotable latch 107 which is adapted to cooperate with the nose to form an eyelet or eye receiving the sewing yarn 108 which, like the yarns 49 and 67 of the layers previously deposited on the mandrel 10, may be formed from rovings, braids, strands or any other suitable form. This sewing yarn 108 is fed from one or more adjustable-frictional bobbins (not shown) and slides in a bent guide 109 borne by a plate 110 which is in turn connected to a movable rod 111, the assembly formed by the guide 109 and the rod 111 making up the hook 103. Arm 101 also continues forwardly beyond the end of rod 111 in the form of a bracket 112 at the ende of which a flexible plate 113 is fixed whereby, as will be explained hereinafter, latch 107 can be closed when needle 105 lifts. Needle 105 is borne by a sleeve 114 which is movable inside head 104 by means which will also be described with reference to FIG. 6.

Rod 111 of hook 103 continues inside the support frame 100 and is connected at its opposite end to two rings 115a, 115b, between which is mounted a collar 115, inside which rod 111 can turn freely. Collar 115 has a guide ring 116 sliding on a fixed transverse rod 117 connected by a fixing plate 118 to the inner surface of casing 119, the height-wise position of which inside frame 100 can be adjusted by a screw 120 mounted to turn freely in the facing wall of the casing and cooperating with a screwthreaded part acting as a nut 121 in the base of the frame. With screw 120 it is thus possible to move casing 119 in frame 100 so as to bring the arm 101 of hook 103 to a suitable height through a slot 122 in the frame to adjust the relative position of the hook in relation to the needle inside the mandrel 10. At its opposite end the collar 115 has a captive roller 123 rolling in the profiled groove 124 of a cam 125 which, when it rotates about its axis 126 parallel to rod 111, enables the latter to undergo a reciprocating transverse movement which is transmitted to the guide 109 and hence to the yarn 108 emerging therefrom near the nose 106 of needle 105. Shaft 126 of cam 125 also has a second cam 127 and is mounted in bearings 128, 129 inside casing 119. The second cam 127 cooperates with a roller 130 mounted loosely at the end of an arm 131 terminating in a collar 132 connected to rod 111. A spring 132a continually returns arm 131 and applies roller 130 against cam 127. The same is mounted eccentrically on shaft 126. On its rotation, it causes lateral displacement of roller 130 and hence rotation of rod 111. As a result of the combined action of the two cams 125, 127, rod 111 bearing hook 103 and distributing the yarn 108 in particular thus experiences double movement, i.e., axial displacement by cam 125 on the one hand, and rotation on itself by cam 127 on the other hand.

With this combination, guide 109 can describe a movement in the form of a substantially circular curve closed on itself about the end of needle 105, and during this movement yarn 108 is fed from its bobbin and then engaged in the nose of the needle on each descent of the latter through the stack formed by the layers 71.

The drive shaft 126 of cams 125, 127 is connected to a drive gear 133 cooperating with a chain 134 which in turn engages a second drive gear 135. The same is fixed on a transverse spindle 136 mounted on bearings 137, 138 provided at the top end of casing 119. At its end, shaft 136 has a bevel gear 139 meshing with a bevel gear 140 connected to a vertical shaft 141 by a key (not shown) fitting in a longitudinal slot 141a allowing relative sliding of this gearwheel 140 on displacement of the casing 119 in the frame 100. At its opposite end, shaft 141 bears a bevel gear 142 receiving its movement from a second gearwheel 143 fixed on a general drive shaft 144. The latter has a gearwheel 145 cooperating with a chain 146 connected to a drive motor (not shown). A second gearwheel 147 is also keyed on shaft 144 and its movement is transmitted to a gearwheel 148 via a chain 149, gearwheel 148 which is mounted on a transverse shaft 150 in turn driving two parallel cams 151, 152 actuating relays (not shown) which by way of suitable connections effect the application of voltage to electromagnets 85, 86 controlling the movement of the carriage 70 on the rack 83 (FIG. 4).

Figure 6:
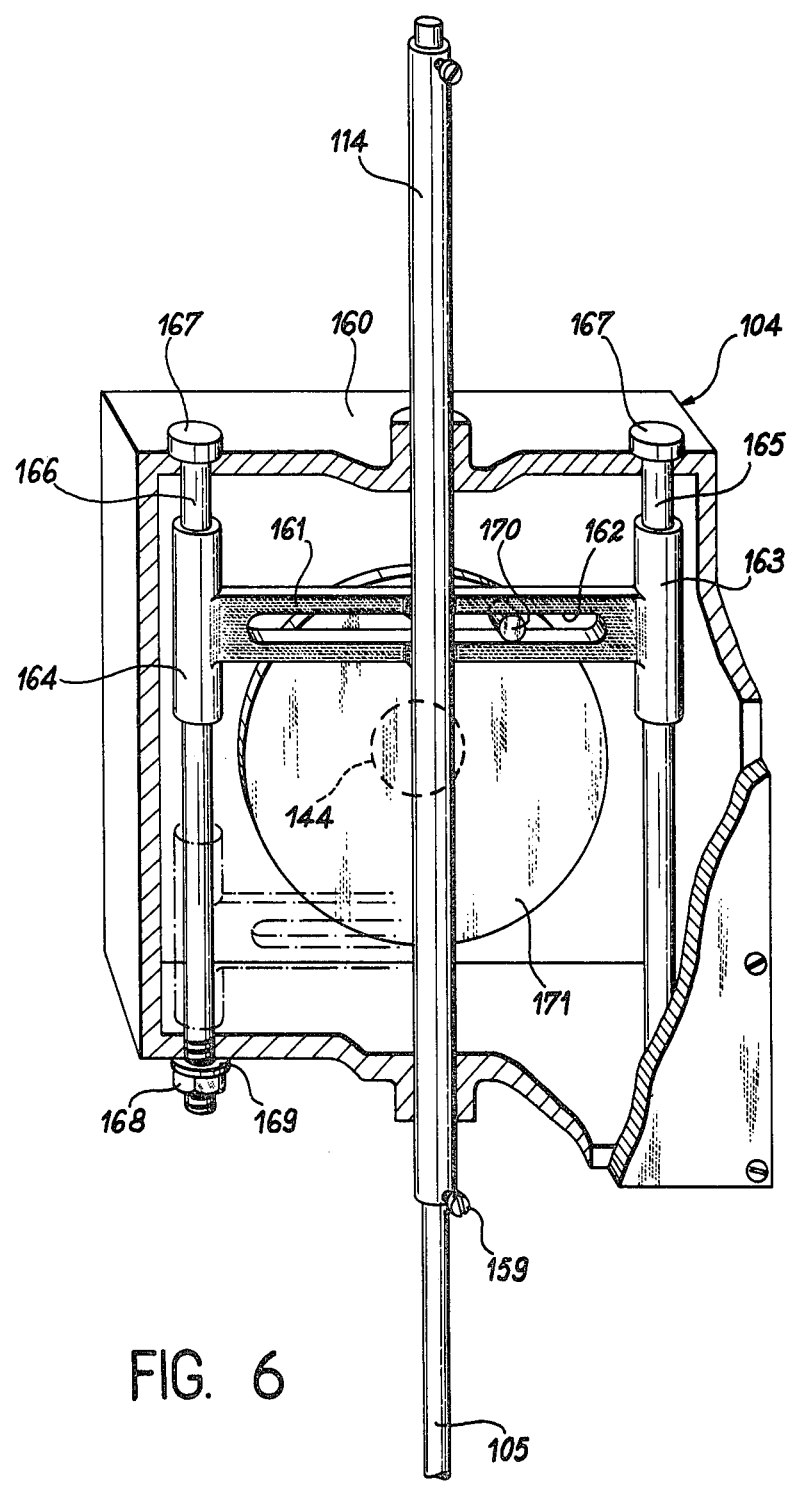
FIG. 6 is a section and partial perspective to a still larger scale showing the sewing head.

FIG. 6 is an enlarged-scale view of the sewing head 104 actuating the needle 105. The latter is mounted in a sleeve 115 and is locked in relation thereto by means of screws 159. Inside the head casing 160, sleeve 114 is connected to a transverse plate 161 formed with a horizontal slot 162. At its ends, plate 161 is connected to two guide bushes 163, 164 sliding along posts 165, 166 and each having a stop head 167 outside the casing 160 and, at their opposite ends, a screwthreaded part cooperating with a nut 168 and a supporting washer 169. The transverse slot 162 in plate 161 cooperates with a stud 170 provided at the periphery of the disc 171, the diameter of which is equal to the amplitude of the axial movement of the needle 105, this disc being fixed on the end of the drive shaft 144 continuing into the arm 102 (FIG. 5). The rotation of the shaft 144 driving the stud 170 is thus converted into a reciprocating displacement of the plate 161 which is transmitted to the needle 105 so that the same can pass through the stack of layers 71 on the mandrel 10, and then produce the required stitching by driving the yarn 108.

To enable the needle 105 to pass through the stack 71 and the yarn 108 to be engaged as it leaves the guide 109 of the hook 103, the mandrel 10 must of course not obstruct the advance of the needle and it must of course be possible for the needle to pass through it and through the stack. To this end, and according to a characteristic feature of this invention, the hollow mandrel 10 is adapted to offer the passage of the needle sufficient clearance to form at least one line of stitching extending, in this example, along a generatrix of the mandrel. This clearance is readily obtained at the needle and the hook in the vertical plane of these two elements by temporarily withdrawing from the mandrel the corresponding segment 11, simply by removing the screws 16 (FIG. 2), the segment then being returned after the line of stitching has been made. The similar operation is then carried out for each segment in turn as the lines of stitching are made along the periphery of the mandrel.

Figure 7:
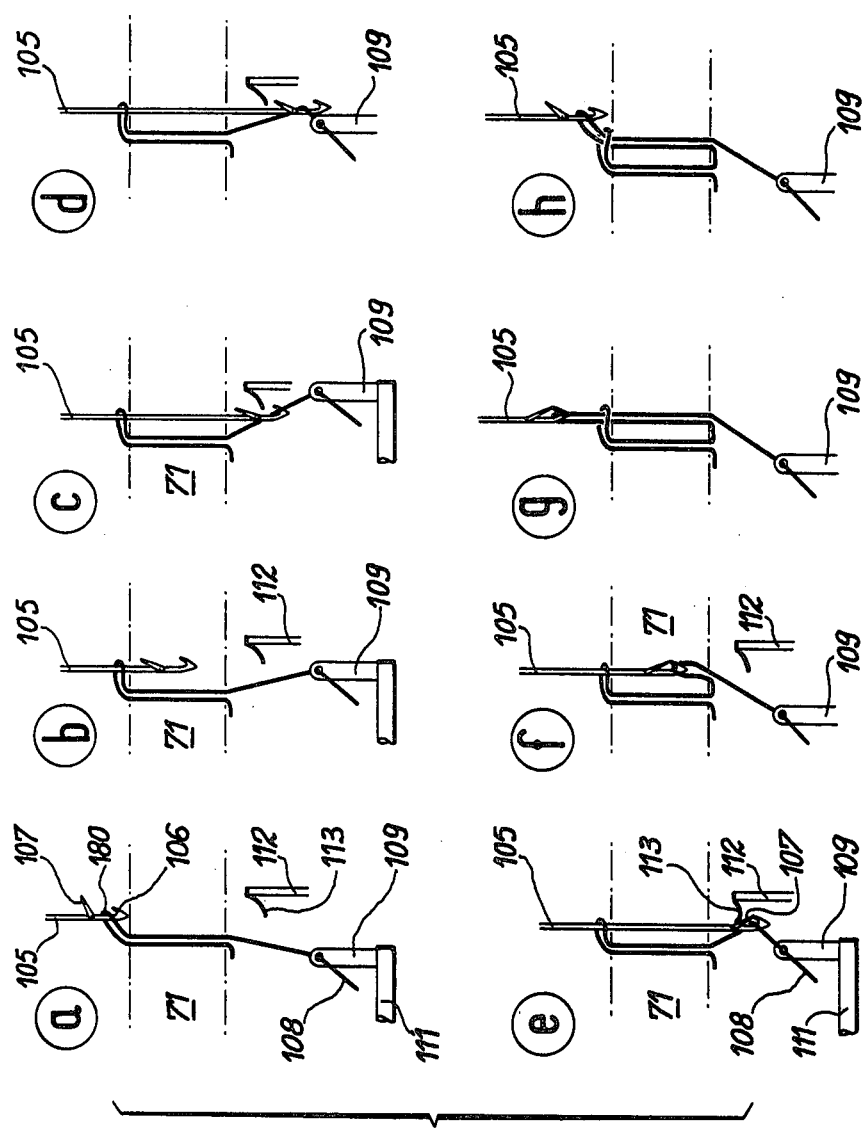
FIG. 7 is a diagram showing eight successive positions of the sewing process used by the machine illustrated in FIGS. 5 and 6.

FIG. 7 is a series of successive diagrams showing the process of forming the stitching in the thickness of the stack 71 by means of the needle 105 and the hook 103 through the clearance in the mandrel previously obtained by removing one of the segments thereof. In diagram a, needle 105 is in the top starting position and hook 103 is behind the needle rearwardly of the previous stitch. Rod 111 (not shown) is in the retracted position, yarn 108 forming a loop 180 at the top of the stack 71 to engage in the nose 106. The needle then starts to move downwards, latch 107 is open, being pushed back by the loop 180. In the next stage shown in diagram b, needle 105 receives a downward movement by the sewing head 104 and perforates the thickness of the stack 71. During this movement, the needle slides in the loop 180, the latch remaining open and extending upwards. During this same movement, rod 111 and guide 109 advance by the action of the cam 125 (FIG. 5) and present the yarn 108 to the needle. In the third stage shown in diagram c, needle 105 continues its downward movement and brings its nose 106 to a level where the rocking movement of the rod 111 as a result of the cam 127 causes the yarn 108 to engage in the nose. In the next stage (diagram d), the needle continues its downward movement so that the flexible plate 113 projects beyond the level of the latch, escaping therefrom to assume a position slightly above it. In the next stage (diagram e), the needle starts to lift, the plate 113 closing the latch 107 which holds the yarn 108 captive; at the same time, hook 103 rapidly moves rearwardly as a result of the reverse displacement or rod 111 by cam 125. The latch, which is still held down, holds the yarn 108 in the nose 106. The yarn is then driven (diagram f) by the needle with minimum friction through the thickness of the stack 71 and continues its movement until it passes through the loop 180, the needle being at its topmost point (diagram g). The hook then pivots by the action of the cam 127 while the needle starts its downward movement to form the next stitch, the loop opening the latch to return the components to their initial state (diagram h). The cycle then recommences, the distance between two successive stitches corresponding to half the spacing between two teeth 84 on the rack 83 (FIG. 4), the alternate control of the electromagnets 85, 86 having effected relative displacement of the mandrel in relation to the needle by the corresponding amount during the cycle.

Repetition of the above cycle produces a continuous line of stitching with consecutive chain stitches through the stack 71 to ensure cohesion of the assembly by introducing into the thickness of the fabric yarns perpendicular to the layer yarns formed by the weft winding and warping operations. When the stack of layers has been sewn along one of the generatrices, the machine components, more particularly the carriage 78, are returned to their starting position. Mandrel 10 then undergoes a suitable rotation about its own axis by means of the handwheel 76 to bring the needle and the hook to the place where a new line parallel to the previous line but offset therefrom is to be obtained. Advantageously, the stitching lines are carried out in successive offset zones of the periphery of the mandrel so that the third yarn direction is distributed suitably throughout the thickness thereof. The sewing operation requires the prior removal of the opposite segment 11 each time so as to provide clearance for the passage of the needle. Once several lines of stitching have been effected, the segment is returned, the process being repeated as often as necessary in the same way with all the mandrel segments to give adequate stitch density and hence sufficient density of the yarns of the third dimension in the thickness of the fabric. Once all the stitches have been made, the end rings 14 and 15 with the spikes 27 are removed, followed by the segments 11, in order to remove the mandrel and release the resulting three-dimensional body of revolution.

Figure 8:
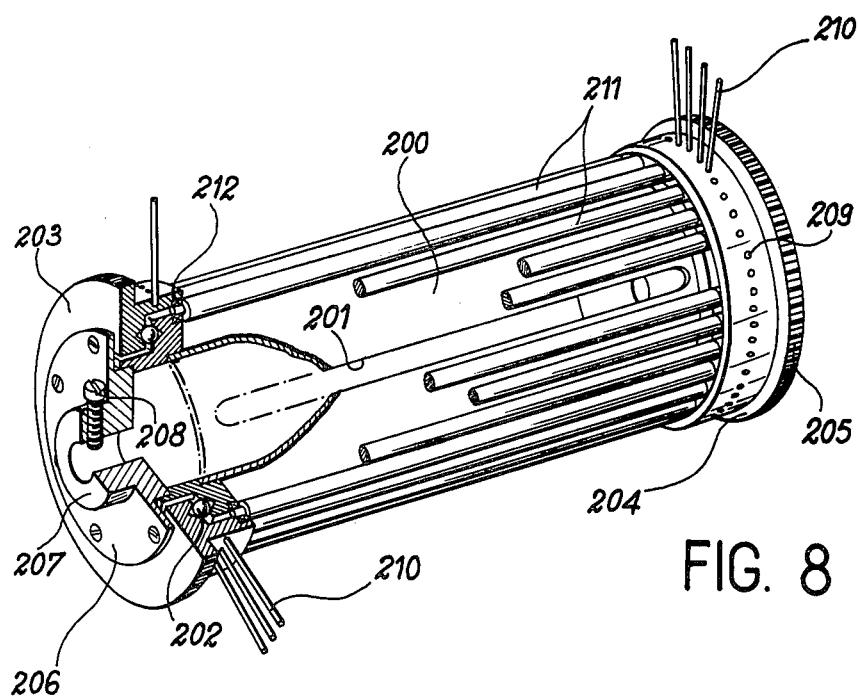
FIG. 8 is a partially broken-away perspective of a variant embodiment of a supporting mandrel for the production of a cylindrical body of three-dimensional fabric.

FIG. 8 shows a variant embodiment of the cylindrical supporting mandrel whereby a body of three-dimensional fabric in the same form can be produced with the method and apparatus described in connection with FIGS. 2 to 7. In this variant, the mandrel is in the form of a hollow cylinder 200 having a longitudinal slot or gap 201. The cylinder 200 is mounted by ball bearings 202 on end rings 203, 204 respectively which, like the example shown in FIG. 2, have teeth 205 at their periphery to drive the mandrel about its axis. End cheeks are fixed on these rings, only one 206 being shown in the drawing, comprising a central sleeve 207 and a locking screw 208 for the passage and securing of a drive shaft (not shown). Finally, rings 203, 204 have a series of apertures 209 in which spikes 210 are fitted to guide and tension the yarn when the weft layers are deposited in the direction of the cylinder generatrices, the spikes being distributed over the rings in a density corresponding to the number of yarns to be deposited. In this variant, the rings 203, 204 are also associated with a series of cylindrical bars 211 uniformly distributed around the periphery of the former 200 and mounted between the surface of the latter and the re-entrant edges of the rings 203, 204 on ball bearings 212 allowing their free rotation in relation to said rings. The first layer of yarns wound helically on the periphery of the rollers 211 is deposited as in the example already described, and the same applies to the application of the second layer on the first layer between the spikes 210 of the end rings. The use of the mandrel differs from the previous example only in respect of the third yarn direction formed by stitching the stack of layers. In this variant, the slot 201 in the cylindrical former 200 is brought into register with a space formed in the bar assembly 211 by the omission of any one thereof. A locking lug or stud (not shown) allows the cage formed by the bars, end rings and cylindrical former to be locked together so that the slot in the cylindrical former and the resulting space coincide so that the sewing needle can pass through the mandrel and form a line of stitches in the direction of the slot 201. To make other lines of stitching, all that is required, without any other modification of the cage of bars around the internal cylindrical former, is to release the locking lug and rotate the stack of layers on the bars by means of the bearings provided at the end of the latter, so that each zone of the cylindrical body where stitching is required is brought into line with the slot 201.

As already stated, the method according to the invention is not restricted to the production of three-dimensional bodies in the form of hollow cylinders of the kind obtained with the apparatus described in either of the above two variants. More particularly, the method may be performed for the production of bodies or parts having other profiles, e.g. for the production of frusto-conical shapes, by means of a rigid counterpart or hollow mandrel of the same shape, one specific embodiment of which is shown in FIG. 9.

Figure 9:
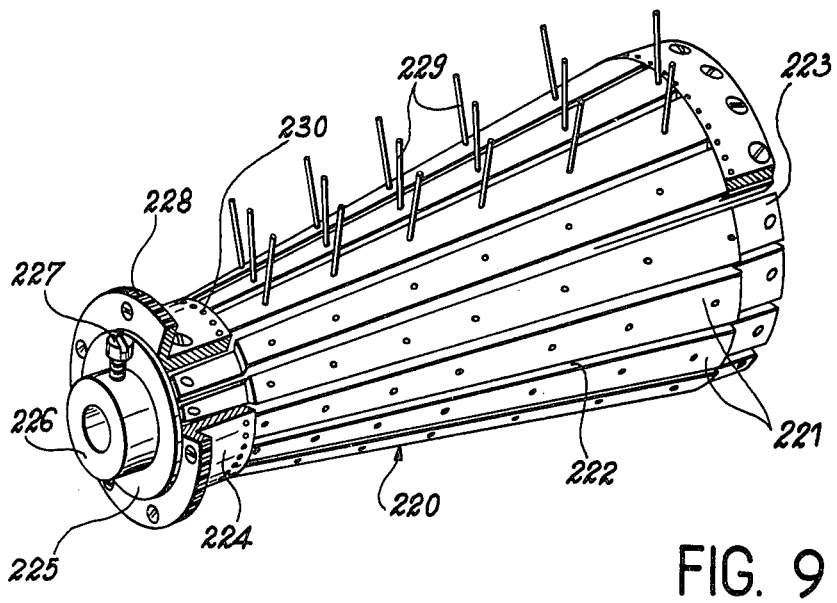
FIG. 9 is a perspective of a variant embodiment of a supporting mandrel adapted to the production of a frusto-conical body.

In FIG. 9, the mandrel 220 adopted is formed as in the example according to FIG. 2 by the assembly of longitudinal tapering segments 221 of suitable profile which define assembly clearances 222, the segments 221 being held by means of joggles 223 formed at the end of the segments, between two end rings, only one of which (224) is shown in the drawing. Ring 224 is connected to an end cheek 225 provided with a central sleeve 226 and a locking screw 227 for the passage of and for securing a drive shaft (not shown). Ring 224 also has external teeth 228 so that the conical mandrel 220 can be rotated, in the absence of the drive shaft, more particularly when the layers stacked on the mandrel are stitched. Finally, mandrel 220 is associated with a series of radial spikes 229 distributed in apertures 230 formed in each end ring and also in similar recesses formed along the generatrices of the segments 221 with spacing which depends upon the cone profile and density with which the cone is to be covered by the layers deposited thereon.

Although the form of the mandrel on which the body of three-dimensional fabric is to be produced does not give rise to any specific difficulties in respect of its production, more particularly as regards giving it a frusto-conical profile, it does require certain special adaptation of the apparatus whereby the successive layers can be deposited on its outer surface to form the fixed stack required and also for making the lines of stitching forming the third direction of the fabric on the stack.

Figure 10:
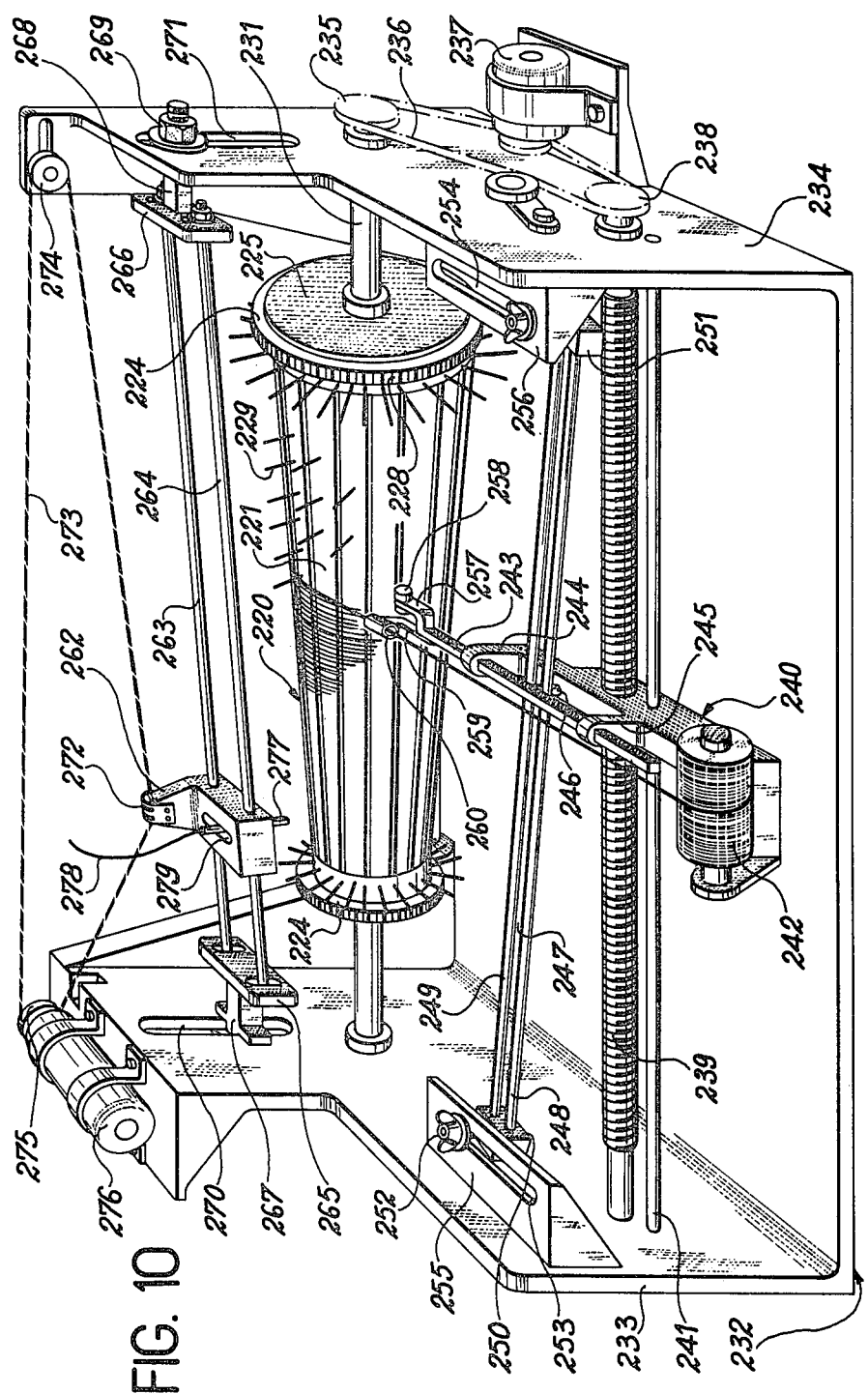
FIG. 10 is a perspective of the first station of the apparatus for producing layers superimposed in two different directions of the mandrel in FIG. 9.

FIG. 10 shows the first part of the machine adapted to the conical shape of the mandrel so that successive layers can be deposited thereon in the circumferential and substantially axial directions respectively. Mandrel 220 is mounted by means of its end cheeks 225 on a drive shaft 231, the assembly again being disposed on a supporting frame 232 having parallel side plates 233 and 234. Shaft 231 has a drive gear 235 cooperating with a chain 236 driven by a motor 237. The chain movement is transmitted to a second gearwheel 238 which transmits its movement with a suitable step-down ratio to a worm 239 supported by the frame 232, said worm 239 producing axial displacement of a first carriage 240 acting as a nut, this being the winder carriage. Rotation of the screw 239 is converted to an axial traversing movement of the carriage 240 with respect to the conical mandrel 220 by means of a parallel bar 241 on which the carriage slides. The carriage carries an adjustable-friction bobbin 242 and a yarn guide 243 mounted freely in two supporting arms 244 and 245. Guide 243 has a stud 246 sliding in a groove 247 formed between two rods 248 and 249 mounted in the frame 232 and parallel to the generatrices of the frusto-conical mandrel 220. At their ends, these rods 248, 249 are connected to two blocks 250, 251 which space them apart and cooperate with locking screws 252 so that the relative orientation of these rods can be adjusted by displacement of these screws in elongate slots 253, 254 provided in two plates 255, 256 borne by the side plates, 233, 234 of the frame 232. At its end facing the mandrel 220, the yarn guide 243 has an angle part 257 at the end of which an electromagnet 258 is mounted. The same cooperates with a flexible metal plate 259 disposed opposite it and provided at the end of a tube or bush 260 through which the yarn 261 delivered by the bobbin 242 passes, said yarn being intended to form the first layer on the mandrel 220 as it winds thereon in the form of a circumferential helix. The electromagnet 258 is intended more particularly to allow regular winding of the yarn 261 while avoiding spikes 229 as it is wound, these spikes being distributed, in the specific case of the conical mandrel shown in FIG. 9, not only over the end rings 224 but also along the length of the mandrel segments 221.

As in the case of the embodiment using a cylindrical mandrel, the apparatus comprises a second carriage 262, the weft carriage, which is adapted to deposit layers of a second type on the conical mandrel, the yarns in this case having a substantially axial and substantially perpendicular orientation to the circumferential orientation of the yarns of the first layers. Carriage 262 is also guided on two parallel rods 263, 264 extending in parallel relationship to the generatrices of the frusto-conical mandrel 220. To this end, these rods are connected at their ends to two brackets 265, 266 which are extended by positioning bars 267, 268 each cooperating with a securing nut 269, the position of which can, however, be adjusted by sliding in slots 270, 271 formed in the side plates 233, 234 of the frame 232. Carriage 262 has a clip 272 engaging a cable 273 guided on an adjustable reversing pulley 274 and cooperating with a drive pulley 275 driven by a motor 276, said cable moving the carriage 262 on the rods 263, 264 in parallel relationship to the generatrices of the conical mandrel 220. Carriage 262 finally includes a yarn guide in the form of a tube or bush 277 for a yarn 278 unwound from a bobbin (not shown), this yarn guide being displaceable transversely in a groove 279 in the carriage by the action of a second electromagnet (also not shown) mounted inside the carriage so that, as in the case of the yarn of the first layers, it can escape as often as necessary from the spikes 229 provided in the surface of the mandrel 220, more particularly on the segments 221 of the latter during the weft laying operation.

Figure 11:
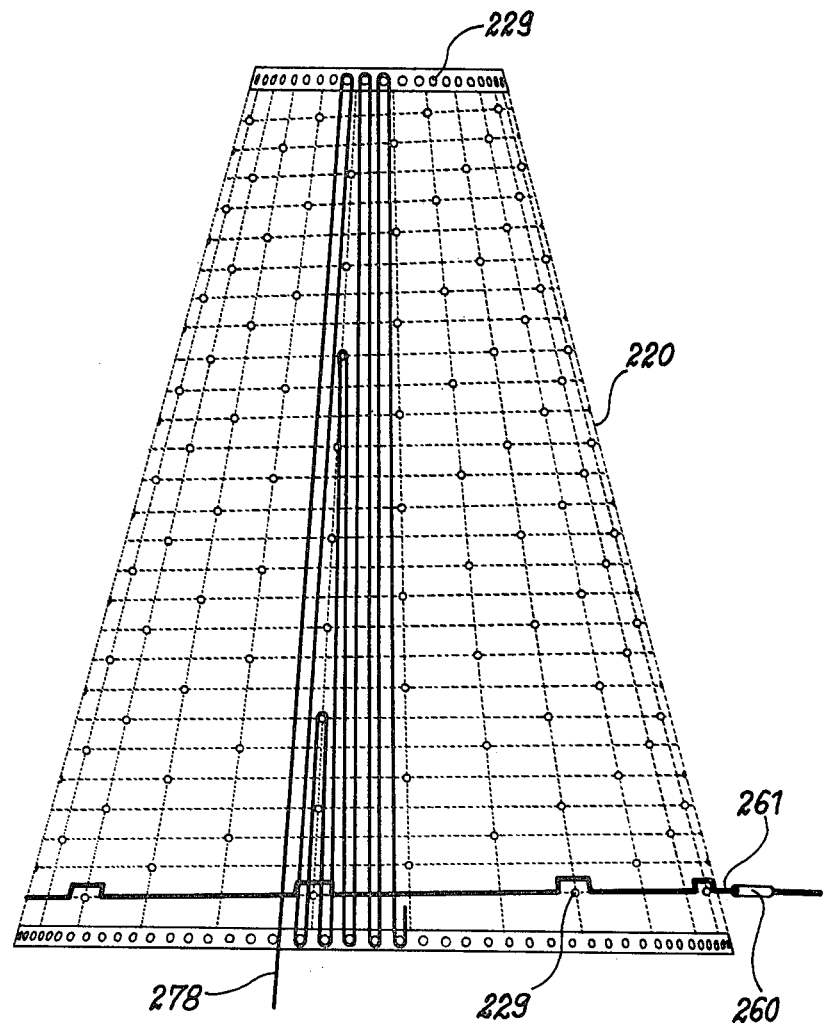
FIG. 11 is a top plan view of a portion of the mandrel according to FIG. 9 showing how the successive layers are deposited in the station of the apparatus shown in FIG. 10.

FIG. 11 is a more detailed illustration of the practical operation of the winder and weft carriages 240 and 262 respectively, and the laying of the yarns 261 and 278 on the outer surface of the mandrel 220 to obtain superposed layers oriented in two different directions. To form the layers, the frusto-conical mandrel requires certain adaptations to produce a substantially homogeneouus density through the stack, because the yarn directions are not strictly perpendicular to one another in view of the nature of the support to which they are applied.

The reason for this is that the number of yarns per centimeter should be substantially constant throughout the frusto-conical mandrel section to give a fabric having identical properties in every direction. That is why the spikes 229 are provided not only in the end rings of the conical mandrel 220 but also in the longitudinal segments 221 thereof.

A given number of suitably distributed spikes 229 are applied to the mandrel 220 at the end rings and longitudinal segments prior to the winding of the first layer, and then in a second stage yarn 261 is applied to the mandrel by means of the winder carriage 240 in a circumferential direction. For this purpose, rotation of the mandrel is synchronized in a suitable drive ratio with that of the worm 239 so that carriage 240 moves in relation to said mandrel, to produce thereon a substantially continuous helix with contiguous turns or a predetermined overlap or spacing. In this first operation, the yarn guide 243 allows the distance between the sleeve 260 and the surface of the mandrel to be kept substantially constant as a result of lug 246 sliding between rods 248 and 249 parallel to the generatrices of the frusto-conical mandrel. In this movement, the bush 260 prevents collision with the spikes 229, the electromagnet 250 effecting the slight transverse displacement required of the bracket 259 during circumferential winding. In FIG. 11, the path followed by the bush 260 delivering the yarn 261 in relation to the surface of the conical mandrel is shown diagrammatically.

Once winding is completed, the second layer is applied in a substantially axial direction but with a slight offset of the carriage so that a substantially homogeneous density is produced in the layer in this direction. As in the previous example, the process comprises first joining the end of the yarn 278 to one of the spikes 229 of one of the end rings 224 and then subjecting the weft carriage 262 to a displacement motion parallel to the axis of the mandrel 220.

In this way, yarn 278 reaches the opposite end ring, turns around the facing spike 229 and then returns to the initial ring. After again turning around a second spike of the latter, the yarn is deposited again on the surface of the mandrel, the carriage movement being stopped before reaching the second ring on a spike 229 associated with the corresponding segment 221, and so on, with successive decreasing as the surface of the mandrel is covered. As in the case of the winder carriage, the reciprocating movements of the weft carriage 262 are combined with a slight displacement inside the slot 279 of the bush 277 delivering the yarn 278 by the action of the electromagnet borne by this carriage, so as to prevent its coming into contact with the spikes distributed along the segments 221, but enable it to turn around the latter on each reversal of the direction of travel of the carriage. Taking into account the slightly oblique orientation thus rendered necessary for the distribution of the yarn 278 between the spikes 229, mandrel 220 must, on each travel of the carriage 262, be slightly offset from its axial direction, particularly if the relative dimensions of the mandrel in respect of width are large as compared with its longitudinal dimensions, i.e., if the angle at the apex of the truncated cone is relatively large, requiring an appreciable oblique orientation to the axis in the case of the weft layers. To this end, provision is made more particularly to alter the orientation of the groove 271 and to mount at the end of one of the guide bars of the carriage 262, e.g. the end of bar 268, cooperating with said groove, a transverse member 280, whose square central part 281 is continued in the form of rod 282 sliding in lugs 283, 284 of the frame. Square part 281 has a rack cooperating with a toothed segment 285. The latter is articulated on a tip 286 provided at the end of the rod 287 of a jack 288, so that the relative orientation of the rods 263 and 264 can be slightly offset to guide the carriage 262 in relation to the mandrel generatrix and enable the yarn to pass between the spikes 229. Of course at the end of each series of successive decreases, the weft carriage recommences its cycle after the mandrel has turned through a suitable angle about its axis by means of the shaft 231.

Advantageously, the control of the winder and weft carriages and the electromagnets associated with the yarn guide of said carriages, is programmed in accordance with the distribution of the spikes disposed on the surface of the mandrel. The carriage control is preferably effected by a change-speed device so that the linear speed of the yarns is substantially constant during the entire winding and weft operations.

Figure 13:
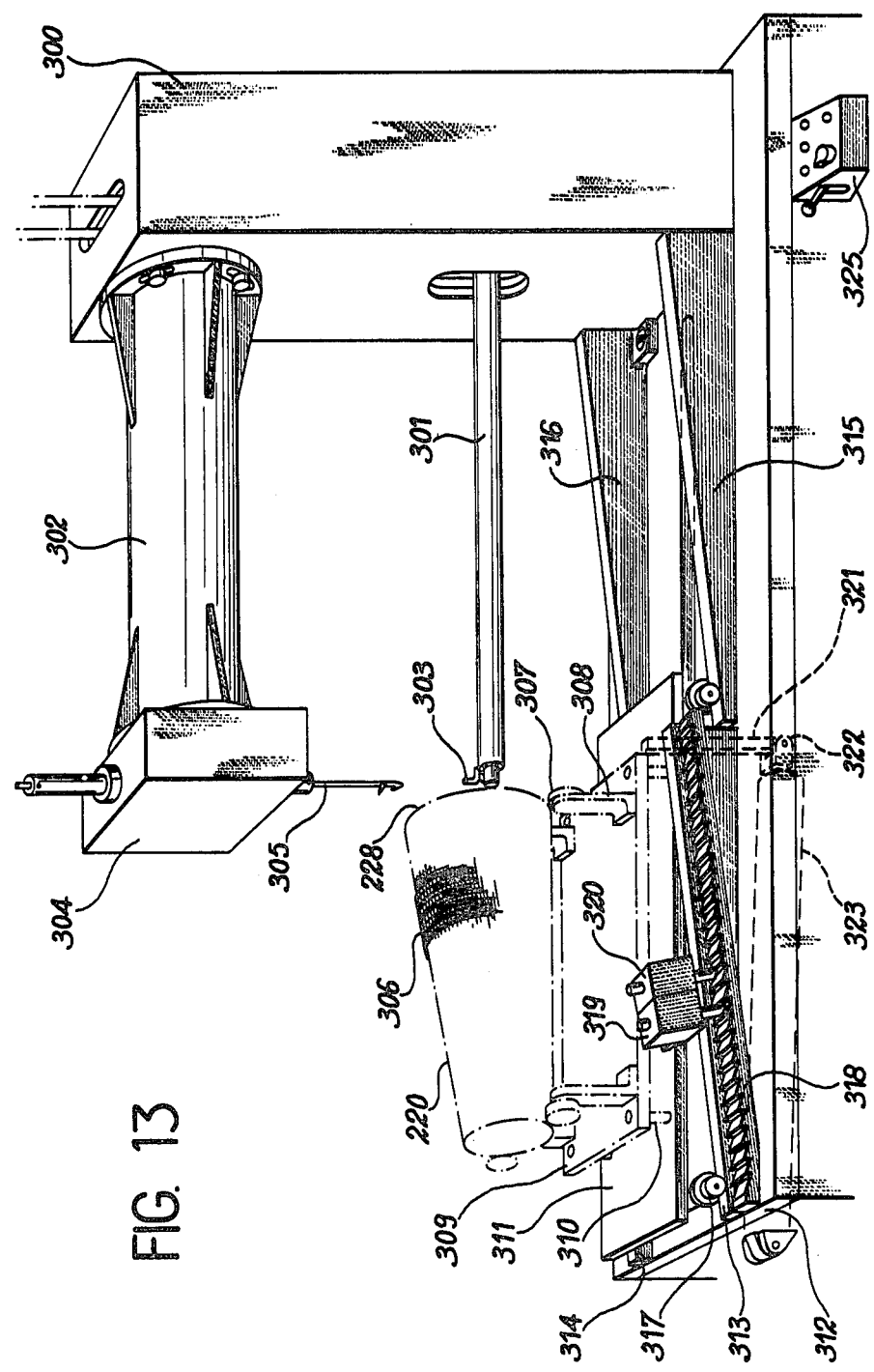
FIG. 13 is a perspective view of the sewing machine adapted to the mandrel shown in FIG. 9.

When the stack of layers has been formed in this way, mandrel 220 is withdrawn and brought to a second part of the machine on which the stack is sewn with a series of radial contiguous stitching lines suitably distributed throughout the stack thickness. This second part is shown in FIG. 13.

This Figure shows features similar to those provided in the first exemplified embodiment, inter alia a sewing machine body 300, comprising two parallel arms 301, 302 respectively supporting a hook 303 and a sewing head 304 provided with a needle 305. Mandrel 220 covered with the stack of layers 306 is mounted in a cradle formed by four gearwheels 307, cooperating in pairs with teeth 228 provided on the mandrel end rings, gearwheels 307 being mounted at the end of the four posts 308 provided on a supporting plate 309. The latter rests by adjustable feet 310 on a carriage 311 bearing on a plinth 312 through the agency of four tracks 313, 314, 315 and 316 each cooperating with a wheel 317 of carriage 311.

According to a specific feature adapted to the case in which the mandrel 220 has a conical shape, the four tracks 313 – 316 are inclined to the horizontal in relation to the plane of the plinth 312 so that on movement of the carriage 311 the latter rises in relation to the plane of the plinth while maintaining the generatrix of the conical mandrel 220, along which a line of stitching is to be made, at a uniform distance from the head 304 and hook 303, the latter in this position being offset from the axis of the mandrel. To this end, one of the carriage tracks, e.g. track 313, is associated with a rack 318 on its outer side surface to cooperate with plunger pistons controlled by two electromagnets 319, 320 provided on the track, the alternate control of these magnets, as in the previous example, enabling the carriage 311 to be advanced stepwise by an amount which is always equal to that separating the successive teeth of the rack. Movement of the latter is produced by an arm 321 articulated at 322 on the rod of a jack 323.

Figure 14:
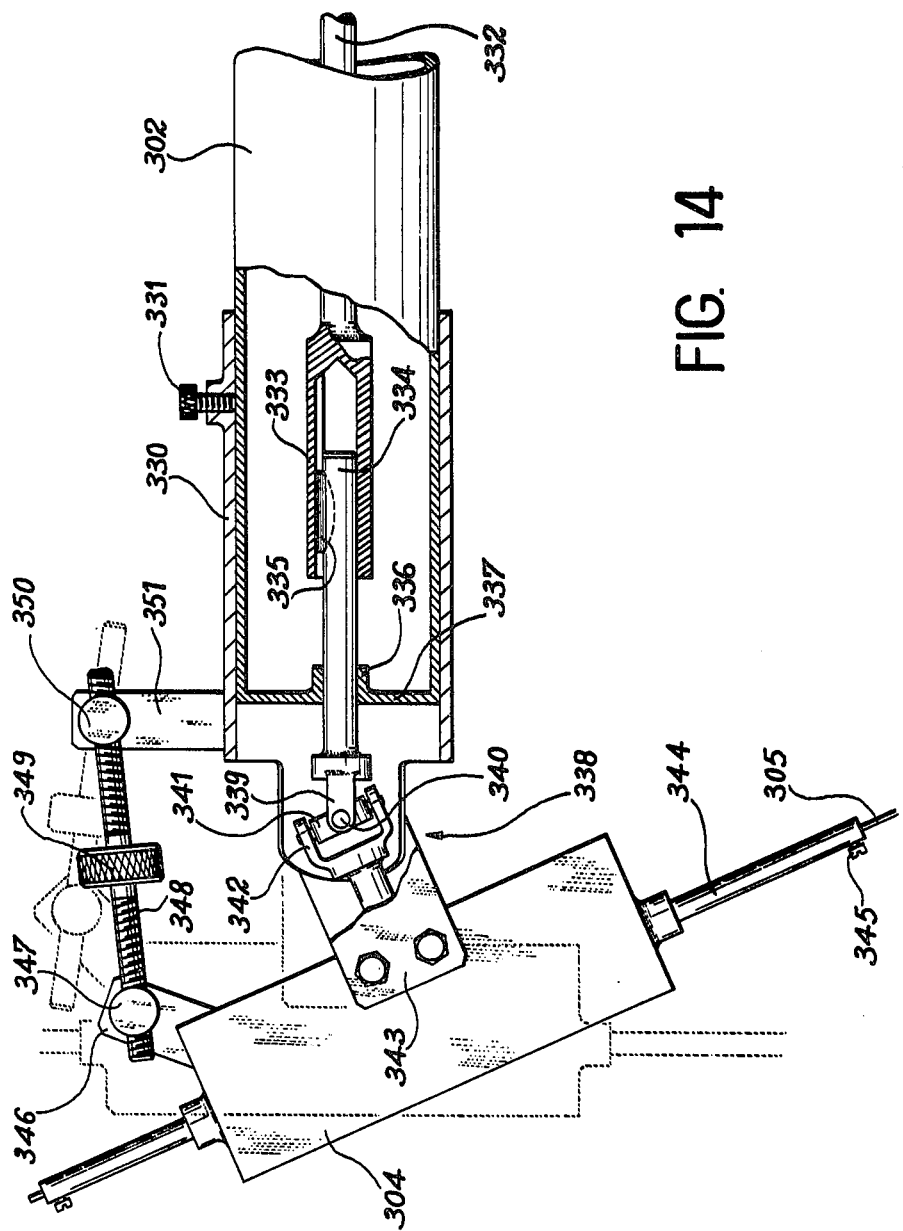
FIG. 14 is an elevation and partial section to an enlarged scale showing the sewing head of the machine according to FIG. 13.

To produce a suitable seam on the stack 306 it will be seen that the needle 305 of the head 304 should be oriented perpendicularly to the surface of the frusto-conical mandrel although such orientation is not absolutely essential. To this end, and according to a feature shown in FIG. 14, the sewing head 304 is so devised as to be rockable in relation to its supporting arm 302 through an angle equal to the angle at the apex of the conical mandrel 220. To this end, arm 302 is continued in the form of a sliding sleeve 330, the position of which is secured with respect to the arm by means of a locking screw 331. Shaft 332 controlling the movements of the needle 305, disposed on the axis of the arm 302, terminates in a hollow bush 303 inside which is mounted a spindle 334 locked in respect of rotation relatively to bush 333 by a key 335, this assembly allowing axial displacement of the shaft 334 in the bush. Shaft 334 is guided in a bearing 336 formed at the center of a plate 337 closing the end of arm 302 and terminates in a cardan system 338 comprising a fork 339 pivoting on the first part 340 of the cardan spider. The second part 341 which is perpendicular to the first part is in turn connected to a second fork 342 which is continued in the form of a lug 343 for fixing to the head 304. With these features, the rotary movement of the drive shaft 332 is transmitted to the needle 305 by the universal joint 338 while nevertheless allowing an angular displacement at the head 304, the needle 305 thereof being mounted in a sleeve 334 and locked in relation thereto by a screw 345. To hold head 304 in its angular position with respect to sleeve 330, the top end of the head has a plate 346 provided with a tapped stud 347 cooperating with a screwthreaded rod 348, the position of which is controlled by a knurled knob 349. At its other end, screwthreaded rod 348 cooperates with a second stud 350 fixed on a lug 351 connected to sleeve 330.

Any of the foregoing embodiments results in a method according to the invention having the essential advantage of enabling bodies or parts of any shapes to be made from three-dimensional fabrics in which the orientation of the yarns and their distribution may be adjusted at will. Thanks to the use of a supporting mandrel whose own shape reproduces that of the body to be made, the mandrel itself being formed from detachable elements which, by successive removal of each of them, allows a clearance to be produced through the mandrel, such as is necessary for the passage of the sewing needle, it is possible to adopt a considerable variety of different profiles arising, more particularly, from all the technically advantageous combinations between a cylinder, cone, barrel, sphere etc. Also, of course, the method enables any parallelepipedal, square section, rectangular or other shape to be produced with very simplified means, the only necessary condition being to provide a passage or a slot for sewing in the third direction through the supporting mandrel on which the alternate layers are superimposed in the first two directions.

The features according to the invention thus offer a very considerable flexibility of use, particularly in respect of choice of materials used in the form of yarns, filaments, fibers, texturized yarns, and so on. Also, in addition to the latitude in respect of the choice of the nature of the yarns, any variants may be considered in respect of the combination of such yarns through the various layers of the three dimensional fabric. By way of example, the method is suitable for the production of such fabrics using monofilaments 12 microns in diameter, equivalent to the smallest dimensions normally available in the industry, to large-diameter yarns as much as 2400 tex and more (1 tex is an element in weight to 10,000 meters of 12-micron yarn). It should be noted that the third yarn direction by which the stack of layers formed in the first two directions is sewn together, should preferably, but not necessarily, be made from a relatively stronger material, advantageously using externally protected yarns produced by any chemical or mechanical method known per se.

Nor is the method according to the invention limited to the orientation of the yarns in any one of the three directions of the fabric. These yarns may be oriented according to any predetermined angle to selected that in the composite material finally obtained the forces to which it is subjected encounter appropriate resistance. With these possibilities it is possible to device a whole series of combinations by varying the angle of winding, the weft angle, or the stitching angle. Similarly, of course, materials of different nature and origin can be used in each yarn direction depending upon the application srequired.

The bodies or components made of three-dimensional fabrics produced by the method according to the invention may satisfy various requirements. More particularly, examples already cited are the production of protective caps and re-entry bodies or heat shields for spacecraft or rockets, since these elements are required to have good mechanical resistance to high temperature, excellent heat insulation properties and high impact strength. Advantageously, a fabric in which the outer layer will provide thermal insulation will be used for such an operation, by making it partly from graphite or carbon filaments. Since the fabric will also be required to have high mechanical strength at high temperatures, it is possible to add to the layers of graphite yarns situated in the thickness of the fabric, high-performance yarns in the form of filaments of boron, boron carbide and silicon carbide. Impact strength will be provided by one or more internal layers of fused silica yarns combined with high-strength carbon yarns disposed in the third, i.e., stitched direction of the fabric.

Similarly it is possible, using the method according to the invention, to vary the thickness of each of the layers and overlap them with the third dimension in any required combination. More particularly, use of the method in question is not limited by the dimensions of the bodies to be produced, since they are in fact independent of the materials used and, depending on circumstances, may be in the form of single or twisted yarns of very small diameter or rovings with parallel filaments of larger diameter. Finally, the use of yarns, fibers or filaments having very high mechanical performances enables them to be used either alone or in combination with synthetic or other fibers, the resulting fabric finally being embedded, if required, in a reinforcing matrix consisting of polyester or epoxy resin, polyamide, and so on. Apart from the selection of a most appropriate yarn and resin mixture or combination, the relative density of these yarns in the various layers should also be taken into account since this density has been found to determine the performances of the resulting fabrics. By way of example, with twisted large-diameter yarns, fabrics can be obtained whose tensile strength is of the order of, or in excess of, 4 kg/mm². However, if these twisted yarns are replaced by a parallel-filament yarns, whereby a relatively high layer density can be obtained, fabrics can be produced whose tensile strength is 15 kg/mm². On the same lines, increased tensile strength may be accompanied by an increase in the modulus of elasticity, compressive strength and resistance to abrasion, by a suitable choice of the distribution of the yarns in the different directions of the fabrics.

Finally, of course, the three-dimensional fabrics produced by means of the method according to the invention may be subjected to any pretreatment in respect of the yarns used. More particularly, carbon or graphite yarns may be infiltrated in the form of a pyrolysis deposit, silica based yarns generally being pre-impregnated with an epoxy resin. Also, before impregnation with the matrix resin, the fabric may undergo suitable finishing to change its structure or improve its hardness or increase its initial density.

Some exemplified embodiments of three-dimensional fabrics produced according to the method of the invention will be given hereinafter solely by way of example.

EXAMPLE 1

Production of a three-dimensional fabric formed by successive layers with different orientations, more particularly at right angles, with weft and warp yarns of glass fiber 236 tex, density being 18 fibers per cm and thickness 0.28 mm, the stack of 63 layers being sewn with a glass yarn of the same size and characteristics. This fabric has a thickness of 35 mm and a density of approximately 1.3 kg/dm³.

EXAMPLE 2

Production of a three-dimensional fabric using carbon rovings each containing 1000 filaments in the warp or weft directions, the density of the rovings in each direction being 20 yarns per cm and the thickness in each layer being 0.25 mm. A stack of 50 layers is sewn with a carbon yarn containing 1000 filaments per roving pre-treated with an epoxy resin. The resulting three-dimensional fabric has a thickness of 25 mm and a density of about 0.76 kg/dm³.

EXAMPLE 3

Production of a three-dimensional fabric in which the warp and weft directions use a silica yarn No. 66 tex, the density in each direction being 2 yarns per cm, the thickness of each layer being 1.6 mm. 10 layers were sewn with a silica yarn No. 34 tex, the stitch density in the longitudinal and radial directions being 2.8 yarns per cm. The fabric was 32 mm total thickness with a density of about 1.2 kg/dm³.

EXAMPLE 4

Production of a three-dimensional fabric in which the warp and weft directions make use of graphite rovings of 10,000 filaments, the density of which in each direction is 4 rovings per cm and the thickness of which in each layer is 0.25 mm. A stack of 100 layers was sewn with a carbon roving of 3,000 filaments pre-treated with an epoxy resin, the stitch density in the longitudinal and radial directions being 8 rovings per cm. The resulting three-dimensional fabric had a thickness of 50 mm and a density of about 0.95 kg/dm³.

EXAMPLE 5

Production of a three-dimensional fabric of the sandwich type obtained by interposing between a central layer two contiguous layers of a different type but similar to one another. The outer layers of the sandwich used 666 tex silica rovings in two perpendicular directions, the density in the two directions being two yarns per cm and the thickness in each layer being 1.6 mm. The central layer was made from a 60-micron tungsten yarn, the density in each direction being 60 yarns per cm and the thickness in each layer being 0.13 mm.

The stack formed from 3 layers of silica yarns and then 30 layers of tungsten yarns and finally three fresh layers of silica yarns, was sewn with a 34 tex silica yarn, in which the stitching density in each longitudinal and radial direction was 2.5 yarns per cm. The resulting three-dimensional fabric had a thickness of about 22 mm and a density of about 10 kg/dm³.

EXAMPLE 6

Production of a three-dimensional fabric using 1,000-filament carbon rovings in the two perpendicular directions in two superimposed layers, the density in each of the directions being 20 yarns per cm and the thickness in each layer being 0.25 mm. A stack of 60 layers was sewn with a texturized glass yarn No. 136 tex with a stitch density of 18 yarns per cm in the longitudinal direction and the radial direction. The three-dimensional fabric had a thickness of 30 mm and a density of 0.96 kg/dm$^3$.

It will be clear from the foregoing that the various examples above have been given solely by way of illustration and the invention can be modified in various ways depending upon the applications in question. Also, of course, the apparatus described may be modified and adapted according to the shape of the three-dimensional fabric body to be produced. Simiarly, the technique whereby the lines of stitching are made can be adapted to each specific case, since the needle may, inter alia, be of a different type, for example of the type known in the art as a compound needle comprising a cylindrical part inside which slides a spindle acting as the latch in the conventional needle. In some cases it is advantageous to provide the sewing head forwardly of the needle with a punch whereby a prior perforation can be produced through the stack of layers to facilitate the penetration of the needle itself on the advance of the head. Finally, the sewing head may be so arranged that the third direction of the stitching yarn is so oriented as to form a given angle with those of the yarns in the other two directions, and this angle no longer need necessarily be 90°. This feature can be obtained very simply, for example, with the cardan system described in connection with FIG. 14.

We claim:

1. A method of producing bodies or pieces of three-dimensional fabric from yarns, filaments, rovings, fibers and the like comprising the steps of forming a first layer of parallel yarns extending in a first direction, superimposing plane by plane on said first layer a second layer of parallel yarns extending in a second direction differing from the first direction, repeating the alternate superimposition of first and second layers of yarns to give a thick stack, sewing said stack of first and second layers by means of a third yarn extending in a direction forming a pre-determined angle to the plane formed by the directions of the yarn in said first and second layers, said third yarn forming a continuous line of stitches, and repeating the sewing of the stack by said third yarn to form a succession of parallel stitching lines which are adjacent to, but offset from one another, to cover the surface of the stack, said third yarn being continuous, tensioned and disposed in straight lines with flattened loop portions the crests of which are situated on the end faces of the stack of layers, the strands of adjacent yarns being parallel to one another in the thickness of the stack, the further steps of forming said first layer of fabric by a continuous yarn disposed along a helix wound circumferentially on a supporting mandrel, superimposing the yarns of said second layer on the helix of said first layer in a substantially axial direction to completely cover said first layer, covering said second layer by a third layer identical to said first layer, and then covering said third layer by a fourth layer identical to said second layer, and so on, then sewing the stack of layers by said third yarn through an apertured supporting mandrel along lines of stitching extending in said axial direction, and finally withdrawing said supporting mandrel.

2. A method according to claim 1, including the step of arranging the yarns in said first and second layers and the sewing yarn, in three respectively perpendicular directions.

3. A method according to claim 1, including the step of extending the continuous line of stitches formed by said third yarn in a plane at right angles to the yarns of said first and second layers.

4. A method according to claim 1, adapted to a body of revolution about an axis, the yarns of the first layers extending in the transverse circumferential direction on the body, the yarns of the second layers extending in the axial direction and the sewing yarn extending in a radial direction, the lines of stitching being oriented in parallel relationship to the direction of the yarns in one of the layers and being offset from one another in the direction of the yarns in the other layer.

5. A method according to claim 1, including the step of stitching the stack of layers by the third yarn by a chain stitch.

6. A method according to claim 1 including the step of impregnating the fabric with a matrix-forming resin filling free spaces between the yarns.

7. A body of three-dimensional fabric comprising a plurality of layers of yarns which are substantially parallel, a stack of at least two of said layers in which the yarns are parallel and oriented differently from one layer to the next, said layers being transversely interconnected by at least one tensioned sewing yarn which extends through said layers in straight lines with flattened loop portions, crests of said loop portions being situated on the faces of the stack, the first of said layers comprising a continuous yarn disposed along a circumferential helix, the second of said layers being superimposed on said helix in a substantially axial direction and covering said first layer, a third layer identical to said first layer covering said second layer, a fourth layer identical to said second layer covering said third layer and so on, said at least one sewing yarn extending in said axial direction.

8. A body of three-dimensional fabric according to claim 7, said sewing yarn as it extends through the layers being perpendicular to the direction of the yarns in the layers of said stack.

9. Apparatus for producing three dimensional fabric comprising a hollow mandrel supporting the fabric body under manufacture, having the outer shape of said body and having an elongate clearance, the position of which varies over the periphery of said mandrel, a first system for distributing the yarn of first layers in a direction linked to said mandrel, the second system for distributing the yarn of second layers in a second direction linked to said mandrel, an orientable sewing head, a needle for said head, a hook cooperating with said needle, said needle and said hook facing one another respectively on either side of the clearance inside and outside said mandrel, means for producing relative displacement between said mandrel and each of said systems for the distribution of the yarns of said first and second layers, and means for displacing said mandrel in relation to said sewing head in the direction of the clearance formed in said mandrel.

10. Apparatus according to claim 9, said hollow mandrel having a profile of revolution about an axis, an assembly of independent adjacent segments supported by two circular end rings forming said mandrel, said elongate clearance being provided by omission of one of said segments between said two rings.

11. Apparatus according to claim 9, said means for producing a relative displacement between said mandrel and said first yarn distribution system including a shaft engaged along the mandrel axis and connected to said end rings by fixing cheeks, said shaft being provided with at least one drive gearwheel cooperating with a motor rotating said mandrel about its axis, and a worm driven in synchronism with said mandrel shaft, said worm cooperating with a winder carriage bearing a yarn guide moving in a plane containing a generatrix of said mandrel, the rotation of said mandrel in combination with the displacement of said carriage applying the yarn around said mandrel as a continuous helix.

12. Apparatus according to claim 9, said rings and also said mandrel segments including apertures, spikes in said apertures extending radially outwards from said mandrel, said spikes tensioning the yarn of the layers in the direction of the generatrices of said mandrel, and a second distribution system for said yarn comprising a weft-winding carriage reciprocating between said spikes.

13. Apparatus according to claim 9, said mandrel including an internally hollow former mounted between said two end rings, said former being surrounded by an assembly of cylindrical bars mounted for rotation on bearings between said rings and parallel to the surface of said former, said former having a permanent clearance at a space between two successive bars.

14. Apparatus according to claim 9, said sewing head needle including a pivoting latch.

15. Apparatus according to claim 9, said sewing head needle being compound comprising a cylindrical part and a movable spindle extending through said part.

16. Apparatus according to claim 9, said sewing head including a punch to pre-perforate said stack of layers to facilitate the subsequent passage of said needle.

* * * * *